(12) United States Patent
Nakashima et al.

(10) Patent No.: US 10,422,060 B2
(45) Date of Patent: Sep. 24, 2019

(54) RETAINER MATERIAL, MANUFACTURING METHOD THEREOF, AND GAS TREATMENT DEVICE USING THE SAME

(71) Applicant: NICHIAS CORPORATION, Tokyo (JP)

(72) Inventors: Akihiro Nakashima, Tokyo (JP); Kazutoshi Isomura, Tokyo (JP); Hiroki Nakamura, Tokyo (JP); Yuki Takeda, Tokyo (JP)

(73) Assignee: NICHIAS CORPORATION, Tokyo (JP)

(*) Notice: Subject to any disclaimer, the term of this patent is extended or adjusted under 35 U.S.C. 154(b) by 0 days.

(21) Appl. No.: 15/553,723

(22) PCT Filed: Feb. 25, 2016

(86) PCT No.: PCT/JP2016/001009
§ 371 (c)(1),
(2) Date: Aug. 25, 2017

(87) PCT Pub. No.: WO2016/136258
PCT Pub. Date: Sep. 1, 2016

(65) Prior Publication Data
US 2018/0038024 A1 Feb. 8, 2018

(30) Foreign Application Priority Data

Feb. 25, 2015 (JP) .................................. 2015-035188

(51) Int. Cl.
*F01N 3/28* (2006.01)
*D04H 1/4209* (2012.01)
(Continued)

(52) U.S. Cl.
CPC .......... *D04H 1/4209* (2013.01); *D04H 1/587* (2013.01); *D04H 1/64* (2013.01); *D21H 13/36* (2013.01);
(Continued)

(58) Field of Classification Search
CPC ........ F01N 3/10; F01N 3/2011; F01N 3/2839; F01N 3/2842
(Continued)

(56) References Cited

U.S. PATENT DOCUMENTS 4,421,599 A * 12/1983 Kuzuoka ................. C04B 30/02
162/100
2010/0166619 A1 7/2010 Dietz
(Continued)

FOREIGN PATENT DOCUMENTS

EP 2730760 A1 5/2014
EP 2824298 A1 1/2015
(Continued)

OTHER PUBLICATIONS

May 31, 2016 International Search Report issued in Patent Application No. PCT/JP2016/001009.
(Continued)

*Primary Examiner* — Tom P Duong
(74) *Attorney, Agent, or Firm* — Oliff PLC

(57) ABSTRACT

A holding material including: inorganic fibers that include 70 wt % or more of an alumina component an organic binder other than polyacrylamide of which the surface is negatively charged, alumina sol, and polyacrylamide having a weight-average molecular weight of 3,000,000 to 6,000,000, wherein the amount of the alumina sol is 2 to 8 parts by weight relative to 100 parts by weight of the amount of the inorganic fibers, and the amount of the polyacrylamide is
(Continued)

0.01 to 1.0 parts by weight relative to 100 parts by weight of the amount of the inorganic fibers.

5 Claims, 1 Drawing Sheet

(51) Int. Cl.
    *D04H 1/587*    (2012.01)
    *D21H 13/36*    (2006.01)
    *D21H 17/37*    (2006.01)
    *D04H 1/64*    (2012.01)
    *F01N 3/10*    (2006.01)
    *F01N 3/021*    (2006.01)

(52) U.S. Cl.
    CPC .......... *D21H 17/37* (2013.01); *F01N 3/0211* (2013.01); *F01N 3/10* (2013.01); *F01N 3/2828* (2013.01); *F01N 3/2835* (2013.01); *F01N 3/2839* (2013.01); *F01N 3/2842* (2013.01); *F01N 3/2853* (2013.01); *F01N 3/2871* (2013.01); *F01N 2330/06* (2013.01); *F01N 2350/04* (2013.01); *F01N 2450/02* (2013.01); *Y02T 10/20* (2013.01)

(58) Field of Classification Search
    USPC ........................................ 422/168, 179, 180
    See application file for complete search history.

(56) References Cited

U.S. PATENT DOCUMENTS

| | | | | |
|---|---|---|---|---|
| 2012/0219464 | A1* | 8/2012 | Sasaki | D01F 9/08 |
| | | | | 422/168 |
| 2013/0305697 | A1* | 11/2013 | Sako | C04B 35/80 |
| | | | | 60/299 |
| 2015/0017072 | A1 | 1/2015 | Nishi et al. | |
| 2015/0033714 | A1 | 2/2015 | Satoh et al. | |
| 2015/0210598 | A1 | 7/2015 | Tomosue et al. | |

FOREIGN PATENT DOCUMENTS

| | | |
|---|---|---|
| JP | H11-156104 A | 6/1999 |
| JP | 2002-194700 A | 7/2002 |
| JP | 2010-529368 A | 8/2010 |
| JP | 2012-143714 A | 8/2012 |
| JP | 2013-148072 A | 8/2013 |
| JP | 2014-058749 A | 4/2014 |
| JP | 2014-092150 A | 5/2014 |
| JP | 2015-017344 A | 1/2015 |
| WO | 2008/156918 A1 | 12/2008 |

OTHER PUBLICATIONS

Aug. 29, 2017 International Preliminary Report on Patentability issued in PCT/JP2016/001009.

Jul. 11, 2018 Extended European Search Report issued in European Patent Application No. 16755008.6.

\* cited by examiner

RETAINER MATERIAL, MANUFACTURING METHOD THEREOF, AND GAS TREATMENT DEVICE USING THE SAME

TECHNICAL FIELD

The invention relates to a holding (retainer) material of a processing structure used in a gas processing (treatment) device for purifying an exhaust gas discharged from an automobile, etc.

BACKGROUND ART

In vehicles such as automobiles, a gas processing device for exhaust gas purification is loaded in order to remove harmful components such as carbon monoxide, hydrocarbons, nitrogen oxides, etc. contained in an exhaust gas of the engine. Such a gas processing device is generally composed of a processing structure formed in a cylindrical shape such as a catalytic carrier, a metal casing for accommodating the processing structure and a holding material attached to the processing structure and disposed in a gap between the processing structure and the casing.

The holding material disposed in a gap between the processing structure and the casing is required to have, in combination, a function of safely holding the processing structure so that the processing structure is prevented from colliding the casing and breaking by vibrations or the like while the automobile is running, as well as a function of sealing so that unpurified exhaust gas does not leak out from the gap between the processing structure and the casing. In order to hold the processing structure safely, it is required to hold the processing structure at a prescribed surface pressure. There is a problem that a surface pressure is lowered by repeated compression accompanied by heating.

For example, Patent Document 1 discloses a holding material having a high surface pressure obtained by combining silica fibers and alumina sol.

RELATED ART DOCUMENTS

Patent Documents

Patent Document 1: JP-A-2013-148072

SUMMARY OF THE INVENTION

An object of the invention is to provide a holding material that has a high surface pressure and can be produced at a high producibility and a gas processing device using the holding material.

As a result of extensive studies, the inventors have found that, by incorporating polyacrylamide with a prescribed molecular weight and alumina sol in prescribed amounts, a holding material having a high surface pressure and high producibility can be obtained. The invention has been completed based on this finding.

According to the invention, the following holding material and the gas processing device or the like are provided.
1. A holding material comprising:
    inorganic fibers that comprise 70 wt % or more of an alumina component,
    an organic binder other than polyacrylamide, a surface of the organic binder being negatively charged,
    alumina sol, and
    polyacrylamide having a weight-average molecular weight of 3,000,000 to 6,000,000,
    wherein
    the amount of the alumina sol is 2 to 8 parts by weight relative to 100 parts by weight of the amount of the inorganic fibers, and
    the amount of the polyacrylamide is 0.01 to 1.0 parts by weight relative to 100 parts by weight of the amount of the inorganic fibers.
2. The holding material according to 1, wherein the ratio of residual surface pressure is 24% or more from a surface pressure at the time of initial releasing after repeating a test 2500 times at a filling density of 0.5 g/cm$^3$ and a Gap release ratio of 12%.
3. The holding material according to 1 or 2, wherein, among intersections of the inorganic fibers, intersections with an alumina sol lump adhered thereto, a shorter diameter of the lump being 500 nm or more, account for 15% or more.
4. A method for producing a holding material comprising:
    mixing inorganic fibers that comprise 70 wt % or more of an alumina component,
    an organic binder other than polyacrylamide, a surface of the organic binder being negatively charged,
    alumina sol, and
    polyacrylamide having a weight average molecular weight of 3,000,000 to 6,000,000 such that the amount of the alumina sol becomes 2 to 8 parts by weight relative to 100 parts by weight of the amount of the inorganic fibers, and the amount of the polyacrylamide becomes 0.01 to 1.0 part by weight relative to 100 parts by weight of the amount of the inorganic fibers, thereby to prepare an aqueous slurry,
    subjecting the aqueous slurry to dehydration molding to prepare a wet molded product, and drying the wet molded product.
5. A gas processing device comprising:
    a cylindrical processing structure,
    a casing for accommodating the processing structure, and
    the holding material according to any one of 1 to 3 that is disposed in a gap between the processing structure and the casing.
6. The gas processing device according to 5, wherein the processing structure is a catalyst carrier or an exhaust gas filter.

According to the invention, it is possible to provide a holding material that has a high surface pressure and can be produced highly efficiently, and a gas processing device using the holding material.

MODE FOR CARRYING OUT THE INVENTION

Hereinbelow, a detailed explanation will be made on the holding material according to the invention.

Figure 1:
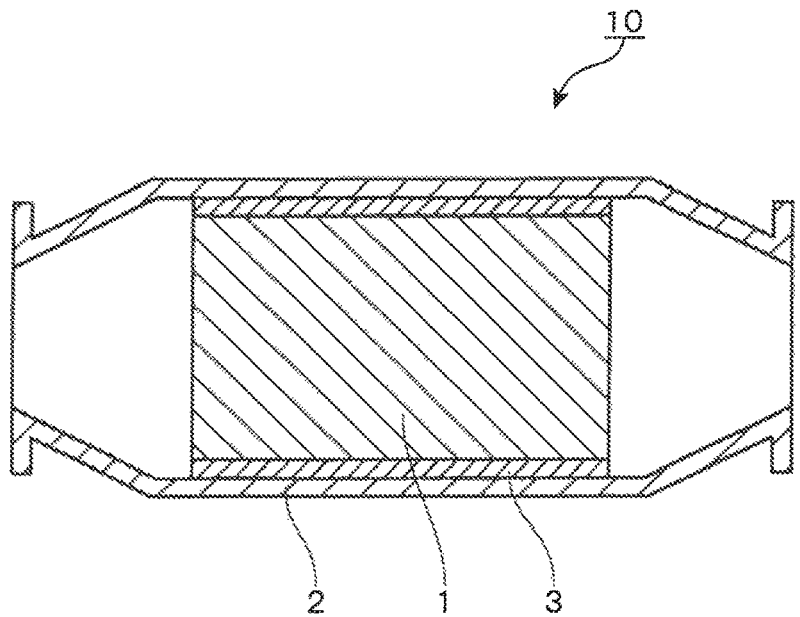
FIG. 1 is a cross-sectional view of a gas processing device to which the holding material according to one embodiment of the invention is mounted.

FIG. 1 is a cross-sectional view schematically shows one embodiment of the gas processing device to which the holding material of the invention is mounted. The gas processing device 10 comprises a cylindrical processing structure 1, a casing 2 for accommodating the processing structure 1 and the holding material 3 that is mounted to the processing structure 1 and is disposed in a gap between the processing structure 1 and the casing 2. The retainer 3 is normally in the shape of a sheet, and is wound around the processing structure 1. It can also be in the shape of a cylinder.

The gas processing device 10 is used in order to remove harmful substances and/or particles contained in a gas. The gas processing device 10 is an exhaust gas processing device for removing harmful substances and/or particles contained in an exhaust gas discharged from an internal combustion engine (gasoline engine, diesel engine, etc) in a vehicle such as an automobile.

Specifically, the gas processing device 10 is a catalytic converter used for removing harmful substances contained in an exhaust gas discharged from a gasoline engine or is a DPF (Diesel Particulate Filter) used for removing particles contained in an exhaust gas discharged from a diesel engine, for example.

The processing structure 1 is a structure having a function of treating a gas. When the gas processing device 10 is a catalytic converter, the processing structure 1 is a catalyst for purifying a gas, and a catalytic carrier having a carrier that carries the catalyst.

Further, if the gas processing device 10 is a DPF, the processing structure 1 is a structure having a filter that catches particles in the gas. In this case, the processing structure 1 may contain a catalyst The casing 2 may be made of a metal such as stainless steel, iron and aluminum. The casing 2 may be divided into a plurality of parts.

The holding material 3 is used in order to retain the processing structure 1 in the casing 2. That is, by being arranged in a compressed state in a gap between the processing structure 1 and the casing 2, the holding material 3 stably retains the processing structure 1 in the casing 2.

The holding material of the invention comprises inorganic fibers containing 70 wt % or more of an alumina component, an organic binder other than polyacrylamide of which the surface is negatively charged, alumina sol and polyacrylamide having a weight average molecular weight of 3,000,000 to 6,000,000.

The inorganic fibers used in the invention normally comprise an alumina component in an amount of 70 to 100 wt % and a silica component in an amount of 0 to 30 wt %. The inorganic fibers preferably comprise an alumina component in an amount of 72 to 98 wt % and a silica component in an amount of 2 to 28 wt %. For example, it is possible to use inorganic fibers comprising 90 to 98 wt % of an alumina component and 2 to 10 wt % of a silica component.

Further, it is preferred that the inorganic fibers comprises 98 wt % or more or 100 wt % of an alumina component and a silica component (including inevitable impurities).

The amount of alumina sol is 2 to 8 parts by weight relative to 100 parts by weight of inorganic fibers. The amount of alumina sol is preferably 2.5 to 7 parts by weight, more preferably 3 to 6 parts by weight. If the amount of alumina sol is less than 2 parts by weight, surface pressure after duration is not improved. If the amount of alumina sol exceeds 8 parts by weight, the mat may be broken when winding. If the amount of alumina sol is increased, erosion resistance is improved.

As an organic binder other than polyacrylamide, the surface of which binder is negatively charged, a known binder can be used. Specifically, rubbers, water-soluble organic polymer compounds, thermoplastic resins, thermosetting resins and the like can be used. An acrylic resin is preferable. As examples of an acrylic resin, a homopolymer and a copolymer of an acrylic acid, an acrylic acid ester, acrylonitrile, methacrylic acid and methacrylic acid ester, an acrylonitrile styrene copolymer, an acrylonitrile butadiene styrene copolymer or the like can be given.

The amount of an organic binder is normally 0.01 to 20 parts by weight relative to 100 parts by weight of inorganic fibers. The amount of an organic binder is preferably 0.1 to 15 parts by weight, more preferably 2 to 12 parts by weight, and particularly preferably 5 to 11 parts by weight. If a large amount of an organic binder is contained, although easiness in winding around a catalytic carrier is improved, an organic binder tends to be easily carbonized during decomposition of the organic binder, resulting in a decrease in surface pressure.

The weight-average molecular weight of polyacrylamide used in the present invention is 3,000,000 to 6,000,000, for example, 4,000,000 to 5,000,000. If the weight-average molecular weight is less than 3,000,000, polyacylamide may not function as a binder. If the weight-average molecular weight exceeds 6,000,000, productivity may be deteriorated.

The amount of polyacrylamide is 0.01 to 1.0 parts by weight relative to 100 parts by weight of inorganic fibers. The amount of polyacrylamide is preferably 0.05 to 0.8 parts by weight, more preferably 0.1 to 0.5 parts by weight. If the amount is less than 0.01 parts by weight, its effects of aggregation are lowered and it may not function as a binder. If the amount exceeds 1.0 parts by weight, the carrier balance is deteriorated, and effects of aggregation may be further lowered and a binder cannot be added.

In addition to inorganic fibers, alumina sol, polyacrytamide, and organic binder, the holding material of the invention can include organic fibers such as pulp and expanding materials such as vermiculite. The holding material of the invention need not contain starch.

The holding material of the Invention may contain 90 wt % or more, 95 wt % or more, 98 wt % or more or 100 wt % of inorganic fibers, alumina sol, polyacylamide and an organic binder (including inevitable impurities). In the holding material of the invention, the organic binder may be burned off by firing.

In the invention, the thickness of the holding material is not limited, but is normally 6 mm to 20 mm. The density is not limited, but is normally 0.10 g/cm$^3$ to 0.25 g/cm$^3$.

The holding material of the invention has a surface pressure residual ratio from a surface pressure at the time of initial release of 24% or more after repeating a test 2500 times at a filing density of 0.5 g/cm$^3$ and a Gap release ratio of 12%. The residual ratio of a surface pressure is more preferably 26% or more.

In the holding material, inorganic fibers are entangled and alumina sol is adhered to intersections of inorganic fibers or around inorganic fibers. It is preferred that, among intersections of inorganic fibers, intersections to which alumina sol adheres to form a lump with a shorter diameter of 500 nm or more account for 15% or more. If the ratio of such intersections is large, a residual ratio of a surface pressure tends to be large. The ratio is more preferably 20% or more.

The method for producing the holding material of the invention is not limited. However, the following method can be taken, for example.

Water, the above-mentioned inorganic fibers, an organic binder, alumina sol and polyacrylamide are mixed to prepare an aqueous slurry. This aqueous slurry is subjected to dehydration molding to prepare a wet molded product. Thereafter, the wet molded product is dried to obtain a holding material.

When preparing an aqueous slurry, adjustment is conducted such that the amount of alumina sol becomes 2 to 8 parts by weight and the amount of polyacrylamide becomes 0.01 to 1.0 parts by weight, relative to 100 parts by weight of inorganic fibers.

EXAMPLES

Hereinbelow, the invention will be explained in more detail with reference to the Examples, which should not be construed as limiting the scope of the invention.

Examples 1 and 2

(1) Production of Retainer

Alumina fibers (96.0 wt % of $Al_2O_3$ component, 4.0 wt % of $SiO_2$ component), an acrylic resin (copolymer of acrylic ester and methacrylic ester) (organic binder), alumina sol and polyacrylamide A (weight-average molecular weight (molecular weight) 4,500,000) were dispersed in water, thereby to prepare an aqueous slurry. The amount of each component is shown in Table 1. The amount in the table is expressed in terms of a part by weight when the amount of alumina fibers is taken as 100 parts by weight.

Subsequently, the aqueous slurry was flown into a dehydration mold provided with a wire mesh. The slurry was subjected to dehydration molding to obtain an alumina fiber-made wet molded product was obtained. Further, while compressing the wet molded body, drying was conducted at 100° C., thereby to obtain a retainer. The density was 0.165 $g/cm^3$.

The weight-average molecular weight was measured by a GPC method by using HLC-8120 as a column and at a flow rate of 1 ml/min.

(2) Evaluation of Retainer

The characteristics of the retainer were evaluated by the following method.

(i) State of Aggregation

The state of aggregation was visually observed by naked eyes. Loose (coarse) aggregation of the fibers is preferable since physical properties become stabilized.

(ii) Surface Smoothness

The surface smoothness was visually observed by naked eyes. A smooth surface is preferable since breakage or cracks are hardly generated in the mat with an uneven part on the surface as a starting point when winding. A case where breakage and cracks were not generated in the mat when winding was evaluated as good (○), and breakage and cracks were generated in the mat with an uneven part on the surface as a starting point when winding was evaluated as bad (x).

(iii) Productivity

A flocculant was incorporated in a water of 10° C. which was stirred at 300 rpm such that the concentration thereof became 0.5 wt %, and the time until the flocculant was perfectly dissolved was measured. When the flocculant was dissolved for a period of time of shorter than 1 hour was evaluated as good (○). When the flocculant was dissolved for a period of time of 1 hour or longer was evaluated as bad (x).

(iv) Surface Pressure Residual Ratio

The surface pressure residual ratio was measured by the following method.

The surface pressure was measured by means of an autograph (universal testing machine manufactured by Shimadzu Corporation). Disks (diameter: 100 mm, thickness: 25 mm) as compression jigs were attached on the upper and lower sides, and the position where the gap between the upper and lower disks became 10 mm was taken as the zero point. Subsequently, the mat prepared above was arranged on the lower disk, and compressed from the zero point so as to attain a filling density of 0.5 $g/cm^3$ at a compression speed of 10 mm/min, and then released to a release ratio of 12% (filling density: 0.446 g/cm). This operation was repeated 2500 cycles. The surface pressure at the time of releasing in the 2500th cycle relative to the surface pressure at the time of initial releasing was taken as a residual surface pressure ratio.

(v) Winding Property

The holding material was wound around a catalytic carrier with a diameter of 70 mm, and winding property was observed. A case where the mat was broken and no cracks were formed was evaluated as good (○), and a case where the mat was broken and a crack was formed was evaluated as bad (x).

(vi) Ratio of Intersections

After observation by means of a microscope, among the intersections of the inorganic fibers, the ratio of intersections at which an alumina sol inorganic binder was adhered in a lump with a shorter diameter of 500 nm or more was measured.

Comparative Examples 1 to 5

Retainers were produced and evaluated in the same manner as in Example 1, except that the components and the amounts shown in Table 1 were used. The results are shown in Table 1.

In Comparative Example 4, polyacylamide B having a weight average molecular weight of 9,000,000 was used as the flocculant

TABLE 1

|  |  |  | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|---|---|
| Components | Inorganic fibers | Alumina fibers | 100 | 100 | 100 | 100 | 100 | 100 | 100 |
|  | Organic binder | Acrylic binder | 10 | 10 | 10 | 10 | 10 | 10 | 10 |
|  | Inorganic binder | Alumina sol | 3 | 6.5 | 0.5 | 1.5 | 12 | 0.5 | — |
|  |  | Colloidal silica | — | — | — | — | — | — | 0.5 |
|  | Flocculant | Polyacrylamide A (Molecular weight: 4,500,000) | 0.3 | 0.3 | 0.3 | 0.3 | 0.3 | — | 0.3 |
|  |  | Polyacrylamide B (Molecular weight: 9,000,000) | — | — | — | — | — | 0.3 | — |
| Producibility | State of aggregation |  | Loose | Loose | Loose | Loose | Loose | Dense | Loose |
|  | Surface smoothness |  | ○ | ○ | ○ | ○ | ○ | x | ○ |
|  | Producibility |  | ○ | ○ | ○ | ○ | ○ | x | ○ |

TABLE 1-continued

|  |  | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|---|
| Properties | Surface pressure residual ratio | 28% | 28% | 21% | 22% | 29% | — | 21% |
|  | Winding property | ○ | ○ | ○ | ○ | x | x | ○ |
|  | Ratio of intersections | 26% | 28% | 8% | 9% | 32% | — | — |
| Overall evaluation |  | ○ | ○ | x | x | x | x | x |

Example 3

Figure 2:
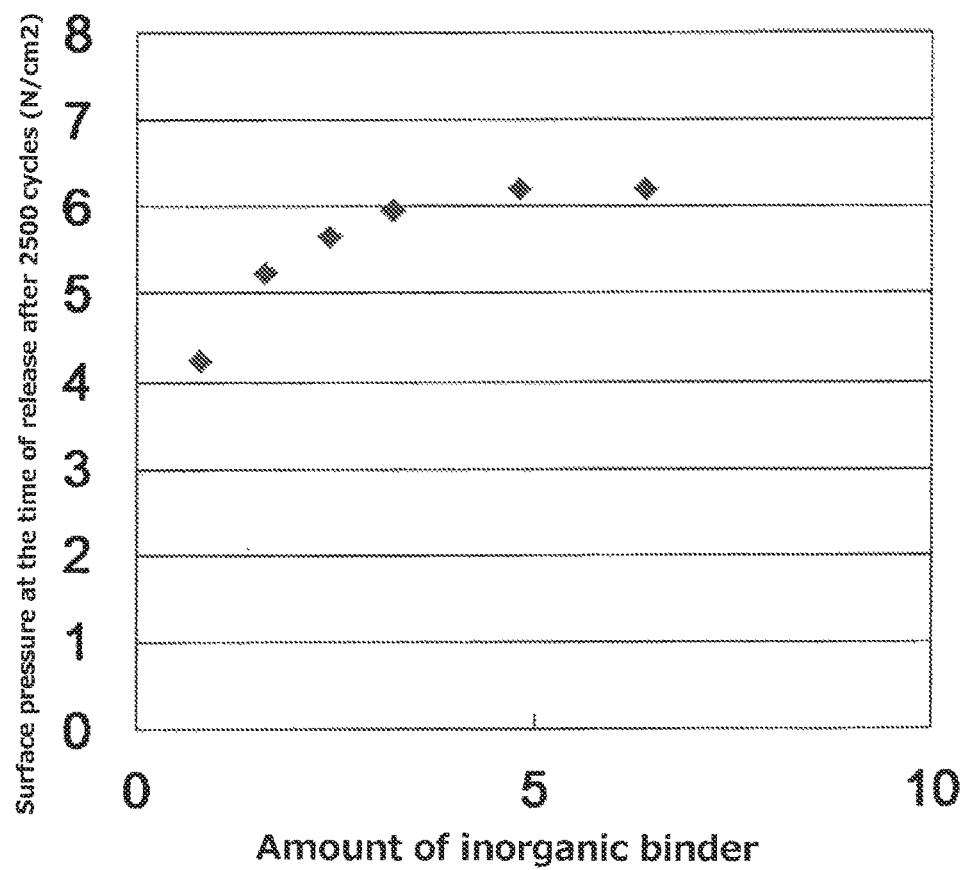
FIG. 2 is a view showing the results of surface pressure measurements conducted for the holding material obtained in Example 3.

A holding material was produced in the same manner as in Example 1, except that the amount of alumina sol was changed from 0.5 parts by weight to 6.5 parts by weight relative to 100 parts by weight of alumina fibers, 10 parts by weight of an acrylic resin and 0.3 parts by weight of polyacrylamide A used in Example 1. In the same manner as in Example 1, the surface pressure at the time of releasing after 2500 cycles was measured. The results are shown in FIG. 2.

INDUSTRIAL APPLICABILITY

The holding material of the invention can be used in a gas processing device for purifying an exhaust gas of an automobile, etc.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A holding material comprising: inorganic fibers that comprise 70 wt % or more of an alumina component, an organic binder other than polyacrylamide, a surface of the organic binder being negatively charged, alumina sol, and polyacrylamide having a weight-average molecular weight of 3,000,000 to 6,000,000, wherein
the amount of the alumina sol is 2 to 8 parts by weight relative to 100 parts by weight of the amount of the inorganic fibers,
the amount of the polyacrylamide is 0.01 to 1.0 parts by weight relative to 100 parts by weight of the amount of the inorganic fibers, and
the inorganic fibers form intersections, and among the intersections of the inorganic fibers, 15% or more of the intersections have the alumina sol adhered to the intersection in the form of a lump, the lump having a shorter diameter of 500 nm or more.

2. The holding material according to claim 1, wherein the ratio of residual surface pressure is 24% or more from a surface pressure at the time of initial releasing after repeating a test 2500 times at a filling density of 0.5 g/cm3 and a Gap release ratio of 12%.

3. A gas processing device comprising: a cylindrical processing structure,
a casing for accommodating the processing structure, and
the holding material according to claim 1 that is disposed in a gap between the processing structure and the casing.

4. The gas processing device according to claim 3, wherein the processing structure is a catalyst carrier or an exhaust gas filter.

5. A method for producing a holding material comprising: mixing inorganic fibers that comprise 70 wt% or more of an alumina component,
an organic binder other than polyacrylamide, a surface of the organic binder being negatively charged,
alumina sol, and
polyacrylamide having a weight average molecular weight of 3,000,000 to 6,000,000 such that the amount of the alumina sol becomes 2 to 8 parts by weight relative to 100 parts by weight of the amount of the inorganic fibers, and the amount of the polyacrylamide becomes 0.01 to 1.0 parts by weight relative to 100 parts by weight of the amount of the inorganic fibers, thereby to prepare an aqueous slurry,
subjecting the aqueous slurry to dehydration molding to prepare a wet molded product, and
drying the wet molded product,
wherein, in the molded product, the inorganic fibers form intersections, and among the intersections of the inorganic fibers, 15% or more of the intersections have the alumina sol adhered to the intersection in the form of a lump, the lump having a shorter diameter of 500 nm or more.

* * * * *